US008839258B2

(12) United States Patent
Rakvic et al.

(10) Patent No.: US 8,839,258 B2
(45) Date of Patent: *Sep. 16, 2014

(54) LOAD BALANCING FOR MULTI-THREADED APPLICATIONS VIA ASYMMETRIC POWER THROTTLING

(75) Inventors: Ryan Rakvic, Annapolis, MD (US); Richard A. Hankins, San Jose, CA (US); Ed Grochowski, San Jose, CA (US); Hong Wang, Fremont, CA (US); Murali Annavaram, Austin, TX (US); David K. Poulsen, Champaign, IL (US); Sanjiv Shah, Champaign, IL (US); John Shen, San Jose, CA (US); Gautham Chinya, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/354,623

(22) Filed: Jan. 20, 2012

(65) Prior Publication Data

US 2012/0131366 A1      May 24, 2012

Related U.S. Application Data

(63) Continuation of application No. 11/322,823, filed on Dec. 30, 2005, now Pat. No. 8,108,863.

(51) Int. Cl.
*G06F 9/46*       (2006.01)
*G06F 1/00*       (2006.01)
*G06F 1/26*       (2006.01)
*G06F 9/48*       (2006.01)

(52) U.S. Cl.
CPC ............ *G06F 9/4893* (2013.01); *Y02B 60/144* (2013.01)

USPC .......... 718/102; 718/104; 718/105; 713/300; 713/320

(58) Field of Classification Search
None
See application file for complete search history.

(56) References Cited

U.S. PATENT DOCUMENTS 5,428,781 A    6/1995  Duault et al.
5,513,354 A    4/1996  Dwork et al.
(Continued)

FOREIGN PATENT DOCUMENTS

EP       0697654        7/1995
JP       H11338719      12/1999
(Continued)

OTHER PUBLICATIONS

Non-Final Office Action mailed Feb. 16, 2010 for U.S. Appl. No. 11/027,445.
(Continued)

*Primary Examiner* — Meng An
*Assistant Examiner* — Tammy Lee
(74) *Attorney, Agent, or Firm* — Blakely, Sokoloff, Taylor & Zafman LLP

(57) ABSTRACT

A first execution time of a first thread executing on a first processing unit of a multiprocessor is determined. A second execution time of a second thread executing on a second processing unit of the multiprocessor is determined, the first and second threads executing in parallel. Power is set to the first and second processing units to effectuate the first and second threads to finish executing at approximately the same time in future executions of the first and second threads. Other embodiments are also described and claimed.

29 Claims, 8 Drawing Sheets

(56) References Cited

U.S. PATENT DOCUMENTS

| | | | |
|---|---|---|---|
| 5,867,711 A | 2/1999 | Subramanian et al. | |
| 6,289,369 B1 | 9/2001 | Sundaresan | |
| 6,289,465 B1* | 9/2001 | Kuemerle | 713/300 |
| 6,411,156 B1 | 6/2002 | Borkar et al. | |
| 6,415,388 B1 | 7/2002 | Browning et al. | |
| 6,434,590 B1 | 8/2002 | Blelloch et al. | |
| 6,513,124 B1* | 1/2003 | Furuichi et al. | 713/322 |
| 6,542,991 B1 | 4/2003 | Joy et al. | |
| 6,564,328 B1 | 5/2003 | Grochowski et al. | |
| 6,622,253 B2 | 9/2003 | Bacon | |
| 6,711,691 B1 | 3/2004 | Howard et al. | |
| 6,766,515 B1 | 7/2004 | Bitar et al. | |
| 6,804,632 B2 | 10/2004 | Orenstien et al. | |
| 7,134,031 B2* | 11/2006 | Flautner | 713/322 |
| 7,140,019 B2 | 11/2006 | May et al. | |
| 7,146,513 B2* | 12/2006 | Misaka et al. | 713/320 |
| 7,174,381 B2* | 2/2007 | Gulko et al. | 709/226 |
| 7,237,129 B2 | 6/2007 | Fung | |
| 7,318,164 B2 | 1/2008 | Rawson, III | |
| 7,376,954 B2 | 5/2008 | Kissell | |
| 7,386,739 B2 | 6/2008 | Ghiasi et al. | |
| 7,398,403 B2* | 7/2008 | Nishioka | 713/300 |
| 7,437,581 B2 | 10/2008 | Grochowski et al. | |
| 7,451,146 B2 | 11/2008 | Boehm | |
| 7,594,127 B2* | 9/2009 | Sutardja | 713/300 |
| 7,610,473 B2 | 10/2009 | Kissell | |
| 7,664,968 B2 | 2/2010 | Bahali et al. | |
| 7,664,971 B2* | 2/2010 | Oh | 713/300 |
| 7,725,901 B2* | 5/2010 | Gissel et al. | 718/105 |
| 2001/0003207 A1 | 6/2001 | Kling et al. | |
| 2002/0049897 A1 | 4/2002 | Sekigouchi et al. | |
| 2002/0095610 A1* | 7/2002 | Nunomura | 713/322 |
| 2002/0099514 A1 | 7/2002 | Watts, Jr. | |
| 2002/0170038 A1 | 11/2002 | Yeh et al. | |
| 2002/0188877 A1 | 12/2002 | Buch | |
| 2003/0023885 A1 | 1/2003 | Potter et al. | |
| 2003/0037089 A1 | 2/2003 | Cota-Robles et al. | |
| 2003/0041228 A1 | 2/2003 | Rosenbluth et al. | |
| 2003/0079093 A1 | 4/2003 | Fujii et al. | |
| 2003/0110012 A1 | 6/2003 | Orenstien et al. | |
| 2003/0117175 A1 | 6/2003 | Green et al. | |
| 2003/0126478 A1 | 7/2003 | Burns et al. | |
| 2003/0217090 A1 | 11/2003 | Chauvel et al. | |
| 2004/0049580 A1 | 3/2004 | Boyd et al. | |
| 2004/0088708 A1 | 5/2004 | Ramanujam et al. | |
| 2004/0107369 A1 | 6/2004 | Cooper et al. | |
| 2004/0216114 A1* | 10/2004 | Lin | 718/105 |
| 2005/0071701 A1* | 3/2005 | Luick | 713/320 |
| 2005/0155032 A1 | 7/2005 | Schantz | |
| 2005/0223382 A1 | 10/2005 | Lippert | |
| 2006/0020831 A1 | 1/2006 | Golla et al. | |
| 2006/0020944 A1* | 1/2006 | King et al. | 718/104 |
| 2006/0064687 A1* | 3/2006 | Dostert | 718/1 |
| 2006/0075404 A1 | 4/2006 | Rosu et al. | |
| 2006/0206881 A1 | 9/2006 | Dodge et al. | |
| 2006/0294398 A1* | 12/2006 | Morris et al. | 713/300 |
| 2007/0067656 A1 | 3/2007 | Ranganathan et al. | |
| 2007/0094444 A1 | 4/2007 | Sutardja | |

FOREIGN PATENT DOCUMENTS

| | | |
|---|---|---|
| JP | 20027367 | 1/2002 |
| JP | 2002007367 | 1/2002 |
| JP | 2002108958 | 4/2002 |
| WO | 9917186 | 4/1999 |
| WO | WO-9917186 | 8/1999 |

OTHER PUBLICATIONS

Non Final Office Action mailed Apr. 28, 2010, for U.S. Appl. No. 11/235,865.
Invitation to Pay Additional Fees mailed Apr. 4, 2006 for PCT Application No. PCT/US2005/035145.
Final Office Action mailed Jul. 21, 2010 for U.S. Appl. No. 11/027,445.
Final Office Action mailed Jul. 21, 2010, for U.S. Appl. No. 11/027,445.
First Office Action for U.S. Appl. No. 11/027,445, mailed Aug. 4, 2009.
First Office Action mailed Aug. 4, 2009, for U.S. Appl. No. 11/027,445.
Non-Final Office Action mailed Feb. 16, 2010, for U.S. Appl. No. 11/027,445.
International Search Report and Written Opinion mailed Jan. 16, 2007 for PCT Patent Application No. PCT/US2006/037042.
International Preliminary Report on Patentability mailed on Apr. 3, 2008 for PCT Patent Application No. PCT/US2006/037042.
Office Action mailed May 11, 2010 for Japanese Patent Application No. 2007-549606.
Decision of Rejection mailed Feb. 1, 2011 for Japanese Patent Application 2009-232857.
Non-Final Office Action mailed May 9, 2011 for U.S. Appl. No. 11/322,823.
Notice of Allowance mailed Sep. 21, 2011 for U.S. Appl. No. 11/322,823, 5 pages.
"HP-UX Process Management", Version 1.3, Apr. 7, 1997.
Notice of Reasons for Rejection mailed May 11, 2010 for Japanese Patent Application No. 2009-232857.
Final Notice of Reasons for Rejection mailed Sep. 7, 2010 for Japanese Patent Application No. 2009-232857.
Agnihotri, P. et al., "The Penn State Computing Condominium Scheduling System", Conference on Nov. 7-13, 1998, Piscataway, NJ.
Albonesi, D. et al., "Dynamically Tuning Processor Resources with Adaptive Processing", Computer IEEE, Computer Society, vol. 36, No. 12, Dec. 12, 2003, pp. 49-58.
Albonesi, D. "Selective Chache Ways: On-Demand Cache Resource ALlocation", Proceedings of the 32nd annual ACM/IEEE International Symposium on Microarchitecture, Haifa Israel, Nov. 16-18, 1999, pp. 248-259.
Anderson, Thomas E. et al., "Scheduler Activations: Effective Kernel Support for the User-Level Management of Parallelism", ACM Transactions on Computer Systems, vol. 10, No. 1, Feb. 1992, pp. 53-79.
Annavaram, M. et al., "Fixing the Sequential Bottleneck by Regulating Energy Per Instruction on CMPs", Technology @ Intel Magazine, Oct. 2005, pp. 1-7.
Annavaram, M. et al., "Mitigating Amdahl's Law Through EPI Throttling", IEEE 2005, 12 pages.
Annavaram, Murali, "Scheduling Optimizations for User-Level Threads", Data Prefetching by Dependence Graph Precomputation; IEEE, 2001.
Aragon, J. et al., "Power-Aware Control Speculation Through Selective Throttling", Proceedings of the 9th International Symposium on High-Performance Computer Architecture, Anaheim, CA, Feb. 8-12, 2003, pp. 103-112.
Arora, Nimar S. et al., "Thread Scheduling for Multiprogrammed Multiprocessors", ACM Symposium on Parallel Algorithms and Architectures; Proceedings of the 10th Annual ACM Symposium on Parallel Algorithms and Architectures; Puerto Vallarta, MX; pp. 119-129; 1998; ISBN: 0-89791-989-0.
Bahar, R. et al., "Power and Energy Reduction via Pipeline Balancing", Proceedings of the 28th Annual International Symposium on Computer Architecture, Goteborg Sweden, Jun. 30-Jul. 4, 2001, pp. 218-229.
Baniasadi, A. et al., "Branch Predictor Prediction: A Power-Aware Branch Predictor for High-Performance Processors", Proceedings of the 2002 IEEE International Conference on Computer Design: VLSI in Computers & Processors, Freiburg, Germany, Sep. 16-18, 2002, pp. 458-461.
Barekas et al. "Nanothreads vs. Fibers for the Support of Fine Grain Parallelism on Windows NT/2000 Platforms", Lecture Notes in Computer Science, pp. 146-159, 2000.
Barroso, L. et al., "Piranha: A Scalable Architecture Based on Single-Chip Multiprocessing", Proceedings of the 27th International Symposium on Computer Architecture, Vancouver, British Columbia, Jun. 10-14, 2000, pp. 282-293.

(56) References Cited

OTHER PUBLICATIONS

Brooks, D. et al., "Dynamic Thermal Management for High-Performance Microprocessors", Proceedings of the 7th Int'l Symposium on High Performance Computer Architecture, Monterey, Mexico, Jan. 20-24, 2001, pp. 171-182.
Buyuktosunoglu, A. et al., "Energy Efficient Co-Adaptive Instruction Fetch and Issue", Proceedings of the 30th Annual Int'l Symposium on Computer Architecture, San Diego, CA, Jun. 9-11, 2003, pp. 147-156.
Chang-Qin, Huang et al., "Intelligent agent-based scheduling mechanism for grid service", Machine Learning and Cybernetics, 2004. Proceedings of 2004 International Conference on Shanghai, China Aug. 26-29. Aug. 26, 2004.
Notice of Allowance mailed Jul. 31, 2009 for Chinese Patent Application No. 200580032835.4.
Office Action mailed Nov. 28, 2008 for Chinese Patent Application No. 200580032835.4.
Dean, Alexander G., "Compiling for Fine-Grain Concurrency: Planning and Performing Software Thread Integration", IEEE Computer Society, Proc of the 23rd IEEE Real-Time Systems Symposium, Center for Embedded Systems Research, 2002.
Delaluz, V. "Reducing dTLB Energy Through Dynamic Resizing", Proceedings of the 21st International Conference on Computer Design, San Jose, CA, Oct. 13-15, 2003, pp. 358-363.
Dieffendorff, D. "Power4 Focuses on Memory Bandwidth: IBM Confronts IA-64, Says ISA Not Important", Microprocessor Report, vol. 13, No. 13, Oct. 6, 1999, 7 Pages.
Efthymiou, A. et al., "Adaptive Pipeline Depth Control for Processor Power-Management", Proceedings of the 2002 IEEE International Conference on Computer Design: VLSI in Computers & Processors, Freibug, Germany, Sep. 16-18, 2002, pp. 454-457.
Office Action mailed Sep. 26, 2007 for European Application No. 05855829.7-2211.
Evans, S. "ISL6565VAL1: Voltage Regulator Down Solutions for Intel Designs", Intersil Americas, Inc. Application Note AN1126, Feb. 16, 2004, 16 pages.
Figueiredo, R. et al., "Impact of Heterogeneity on DSM Performance", 6th International Symposium on High Performance Computer Architecture, Toulouse France, Jan. 2000, pp. 26-35.
Fleischmann, M. "LongRun Power Management: Dynamic Power Management for Crusoe Processors", Transmeta Corporation, Jan. 17, 2001, 18 pages.
Folegnani, D. et al., "Energy-Effective Issue Logic", Proceedings of the 28th Annual International Symposium on Computer Architecture, Goteborg, Sweden, Jun. 30-Jul. 4, 2001, pp. 230-239.
Gebotys, C. et al., "Power Minimization in Heterogeneous Processing", Proceedings of the 29th Annual Hawaii Conference on System Sciences, Maui, Hawaii, Jan. 3-6, 1996, pp. 330-337.
Goda, Kazuo et al., "Resources on Demand for Parallel Database Processing Using Shared Storage Pool", Technical Report published by The Institute of Electronics, Information and Communication Engineers (IEICE); Oct. 10, 2002; vol. 102, No. 377, pp. 1-6 (Domestic Academic Conference Paper No. 2004-00218-01).
Goel, S. et al., "Distributed Schedualer for High Performance Data-Centric Systems", IEEE Tencon 200—Conference on convergent technologies for the Asia Pacific Region—Bangalore, India, vol. 4, 4 Conf. 18, Oct. 15, 2003, whole document.
Gonzalez, J. et al., "Dynamic Cluster Resizing", Proceedings of the 21st International Conference on Computer Design, San Jose CA, Oct. 13-15, 2003, pp. 375-378.
Gunther, S. et al., "Managing the Impact of Increasing Microprocessor Power Consumption", intel Technology Journal, Q1 Issue, 2001.
Hammond, L. et al., "The Stanford Hydra CMP", HotChips '99, Palo Alto CA, Sep. 1999.
Hollingsworth, Jeffrey K., Critical Path Profiling of Message Passing and Shared-Memory Programs;IEEE Transactions so Parallel and Distributed Systems, vol. 9, No. 10; Oct. 1998.
Honda, Dai et al., "An Efficient Caching Technique Using Speculative Threads on Hyper-Threading Technology", IPSJ Research Report, Information Processing Society of Japan (IPSJ), vol. 2004, No. 80 (ARC-159) Jul. 31, 2004; English Abstract available only, pp. 43-48.
Int'l Preliminary Report on Patentability mailed Jul. 13, 2007 for Int'l Application No. PCT/US2005/047334.
Int'l Preliminary Report on Patentability mailed Apr. 3, 2007 for Int'l Application No. PCT/US2005/35145.
Int'l Search Report mailed Aug. 2, 2006 for Int'l Application No. PCT/US2005/35145.
Int'l Search Report mailed Jul. 6, 2006 for Int'l Application No. PCT/US2005/047334.
International Roadmap Committee, "International Technology Roadmap for Semiconductors: Executive Summary", 2003 Edition, 65 Pages.
Isci, C. et al., "Runtime Power Monitoring in High-End Processors: Methodology and Empirical Data", Proceedings of the 36th Annual IEEE?ACM International Symposium on Microarchitecture, San Diego CA, Dec. 3-5, 2003, pp. 93-104.
Japanese Office Action mailed Jul. 7, 2009 for Japanese Application No. 2007-533787.
Japanese Office Action mailed Nov. 17, 2009 for Japanese Application No. 2007-533787.
Korean Final Rejection mailed Sep. 18, 2009 for Korean Application No. 2007-7017501.
Korean Office Action mailed Feb. 27, 2008 for Korean Patent Application No. 10-2007-7006963.
Korean Office Action mailed Nov. 28, 2008 for Korean Application No. 2007-7017501.
Kumar, Rakesh et al., "A Multi-Core Approach to Addressing the Energy-Complexity Problem in", Dep't of Computer Science and Engineering; Univ of CA, San Diego; In Proc of the Workshop on Complexity-Effective Design(WCED), Jun. 2003.
Kumar, R. et al., "Single-ISA Heterogeneous Multi-Core Architecture for Multithreaded Workload Performance", ACM SIGARCH Computer Architecture News, vol. 32, Issue 2, Mar. 2004, pp. 64-75.
Kumar, R. et al., "Single-ISA Heterogeneous Multi-Core Architectures: The Potential for Processor Power Reduction", Proceedings of the 36th International Symposium on Microarchitecture, San Diego, CA, Dec. 3-5, 2003, pp. 81-92.
Larus, James R. et al., "Using Cohort Scheduling to Enhance Server Performance", Microsoft Research, Proceedings of the 202 USENIX Annual Technical Conference, Monterey CA, Jun. 10, 2002.
Liu, C. et al., "Exploiting Barriers to Optimize Power Consumption of CMPs", IEEE 2005, 10 pages.
Manne, S. et al., "Pipeline Gating: Speculation Control for Energy Reduction", Proceedings of the 25th Annual International Symposium on Computer Architecture, Barcelona, Spain, Jun. 27-Jul. 2, 1998, pp. 132-141.
Marr, Deborah T. et al., "Hyper-Threading Technology Architecture", Intel Technology Journal Q1, Intel Corporation, Feb. 14, 2002, vol. 6 Issue 1, pp. 4-15.
Mayes, K. R. et al., "User-Level Threads on a General Hardware Interface", Operating Systems Review, ACM, New York, US, vol. 29, No. 4, Oct 1995, pp. 57-62.
Menasce, D. et al., "Cost-Performance Analysis of Heterogeneity in Supercomputer Architectures", Proceedings of the 1990 Conference on Supercomputing, New York, NY Nov. 12-16, 1990, pp. 169-177.
Morad, T. et al., "Asymmetric Cluster Chip Multi-Processing", ACCMP, CCIT Report #488, May 2004.
Moriyama, Takao et al., "A Multiprocessor Resource Management Scheme which Considers Program Grain Size", IPSJ Research Report, Info Processing Society of Japan (IPSJ), Jul. 18, 1990, vol. 90, No. 60, (Nat'l Academic Article 2000-00160-017) pp. 103-108.
Oikawa, Shuichi et al., "User-Level Real-Time Threads", Proceedings of the 11th IEEE Workshop on Real-Time Operating Systems and Software, (RTOSS'94), May 1994, pp. 7-11.
Oka, M. et al., "Designing and Programming the Emotion Engine", IEEE Micro, Nov.-Dec. 1999, pp. 20-28.
Parikh, D. et al., "Power Issues Related to Branch Prediction", Proceedings of the 8th International Symposium on High-Performance Computer Architecture, Boston MA, Feb. 2-6, 2002, pp. 233-344.
Int'l Preliminary Report on Patentability mailed Mar. 26, 2008 for Int'l Application No. PCT/US2006/037042.

(56) References Cited

OTHER PUBLICATIONS

Int'l Search Report mailed Apr. 1, 2005 for Int'l Application No. PCT/US2006/037042.
Sasada, Koichi et al., "Implementation and Evaluation of a Thread Library for Multithreaded Architecture", International Conference on Parallel and Distributed Processing Techniques and Applications, vol. 2, 2003, pp. 609-615.
Seng, J. et al., "Power-Sensitive Multithreaded Architecture", Proceedings of the 2000 IEEE International Conference on Computer Design: VLSI in computers & processors, Austin TX, Sep. 17-20, 2000, pp. 199-206.
Stonebreaker, M. et al., "The Design of POSTGRES", Proceedings of the 1986 ACM SIGMOD International Conference on Management of Data, Washington DC, May 28-30, 1986, pp. 340-355.
Tschanz, J. et al., "Dynamic-Sleep Transistor and Body Bias for Active Leakage Power Control of Microprocessors", IEEE Journal of Solid-State Circuits, vol. 38, No. 11, Nov. 11, 2003, pp. 1838-1845.
Turner, V. et al., "Sun's Throughput Computing Strategy to create a Quantum Change in Server Performance", IDC White paper, Feb. 25, 2004, whole document.
Taiwan Office Action mailed Nov. 21, 2007 for Taiwan Application No. 94133804.
Taiwan Office Action mailed Dec. 30, 2008 for Taiwan Application No. 94133804.
Non-Final Office Action mailed Aug. 4, 2009 for U.S. Appl. No. 11/027,445.
Notice of Allowance mailed Jun. 6, 2008 for U.S. Appl. No. 10/952,627.
Non-Final Office Action mailed Jun. 22, 2007 for U.S. Appl. No. 10/952,627.
Non-Final Office Action mailed Dec. 11, 2007 for U.S. Appl. No. 10/952,627.
Yoshiki, Satou et al., "Proposals for Realizing Partial Continuous Execution in Java", Information Processing Research Journal, Information Processing Society of Japan, Mar. 29, 2002, vol. 2002, Section 32, pp. 85-90 (National Society Paper 2003-01445-014), pp. 85-90.
Rejection Decision issued for Japanse Application No. 2007-53378, mailed Jan. 22, 2013.
Decision of Rejection issued for Japanese Application No. 2011-123762, mailed Jul. 9, 2013.
Office Action issued for Japanese Application No. 2011-123762, mailed Dec. 11, 2012.

\* cited by examiner

```
If Thread X begins execution
    // first set power budget that is determined by last iteration
    // a prediction of power budget is used that tries to correct imbalance
    Processor.power = Thread{X}.power // begin timer for this thread to be used for prediction for next loop
    Thread{X}.begin_timer = TSC If Thread X ends execution
    // calculate prediction to be used to throttle processors next time
    Thread{X}.time = TSC - Thread{X}.begin_timer
    // if we are much longer than other thread
    If Thread{X}.time >> Thread{other}.time
        // upgrade our power budget by a predetermined increment
        // i.e. 1/8 power increase
        Thread{X}.power += power_threshold_increment
        // decrement other threads power budget
        Thread{other thread}.power -= power_threshold_increment
    Else
        // either we ended first or near the other thread
        // don't do anything
```

FIG. 6

LOAD BALANCING FOR MULTI-THREADED APPLICATIONS VIA ASYMMETRIC POWER THROTTLING

CLAIM OF PRIORITY

The present patent application is a Continuation of, and claims priority to and incorporates by reference in its entirety, the corresponding U.S. patent application Ser. No. 11/322,823, entitled, "LOAD BALANCING FOR MULTI-THREADED APPLICATIONS VIA ASYMMETRIC POWER THROTTLING" filed on Dec. 30, 2005, and issued as U.S. Pat. No. 8,108,863 on Jan. 31, 2012.

FIELD OF THE INVENTION

Embodiments of the invention relate to the field of computer systems and more specifically, but not exclusively, to load balancing for multi-threaded applications via asymmetric power throttling.

BACKGROUND

In order to increase performance of information processing systems, such as those that include processors, both hardware and software techniques have been employed. On the hardware side, processor design approaches to improve processor performance have included increased clock speeds, pipelining, branch prediction, super-scalar execution, out-of-order execution, and caches. Many such approaches have led to increased transistor count, and have even, in some instances, resulted in transistor count increasing at a rate greater than the rate of improved performance.

Rather than seek to increase performance strictly through additional transistors, other performance enhancements involve software techniques. One software approach that has been employed is known as "multithreading." In software multithreading, an instruction stream may be divided into multiple instruction streams, often referred to as "threads," that may be executed in parallel. However, today's systems fail to manage threads for optimal system performance.

BRIEF DESCRIPTION OF THE DRAWINGS

The embodiments of the invention will be understood more fully from the detailed description given below and from the accompanying drawings of various embodiments of the invention, which, however, should not be taken to limit the invention to the specific embodiments, but are for explanation and understanding only.

FIG. 6 shows pseudo-code for load balancing via asymmetric power throttling in accordance with an embodiment of the invention.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other.

Embodiments described herein include an asymmetric power throttling algorithm and algorithmic mechanism to monitor dynamic thread behavior of user-level multithreaded applications, such as Portable Operating System Interface Unix (POSIX) compliant applications, and use the analysis to optimize the execution performance via strategies for judicious profile-guided prediction-based asymmetric power throttling.

Figure 1:
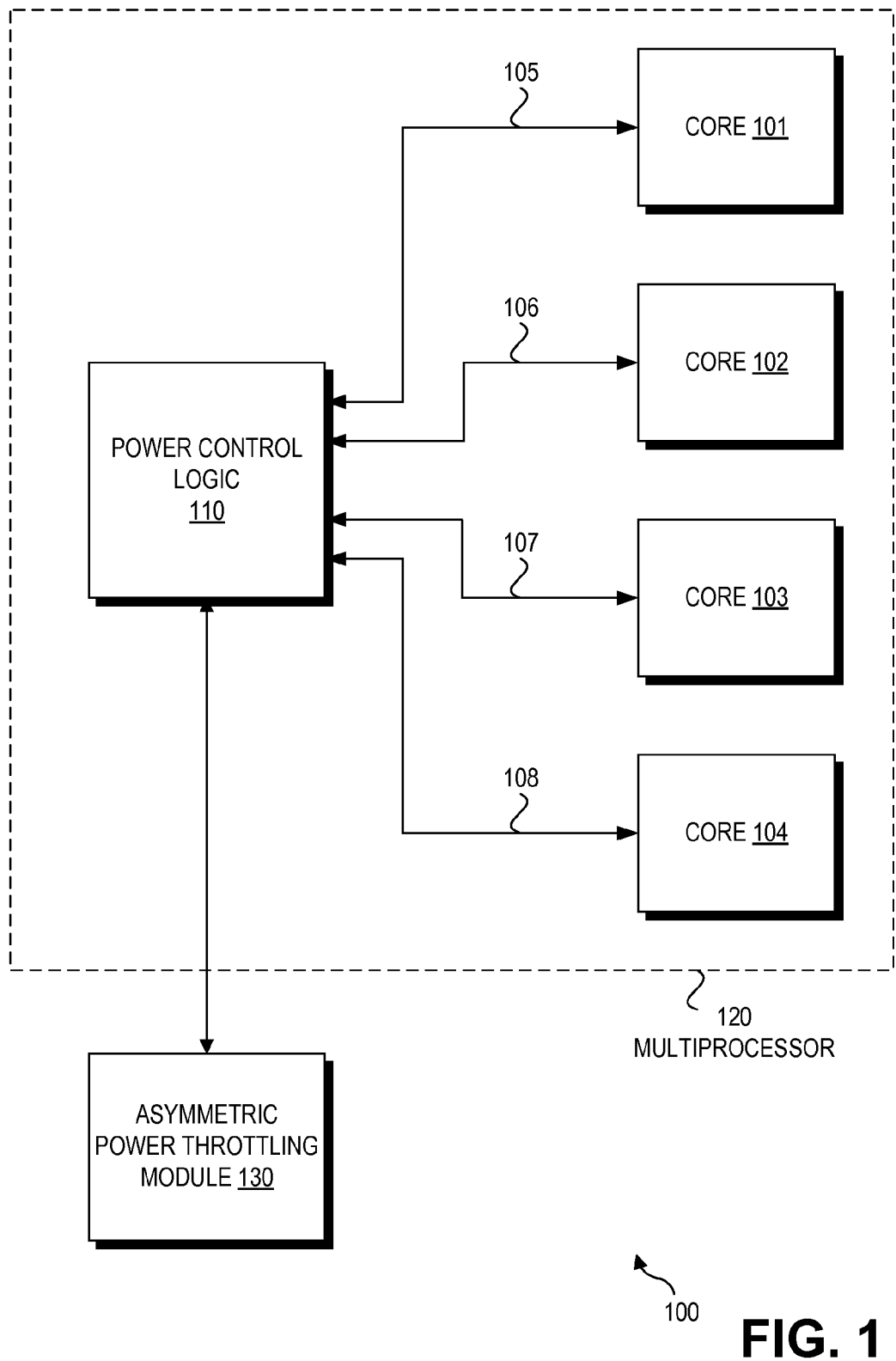
FIG. 1 is a diagram illustrating a multiprocessor system in accordance with an embodiment of the invention.

Turning to FIG. 1, a multiprocessor system 100 in accordance with an embodiment of the invention is shown. Multiprocessor system 100 includes a multiprocessor (MP) 120 coupled to an asymmetric power throttling (APT) module 130. As will be described in further detail below, asymmetric power throttling module 130 may obtain the execution times of threads executing on multiprocessor 120. APT module 130 may use these execution times to throttle the power consumption of individual processing units to equalize the execution time of threads executing in parallel. It has been observed that overall execution time is minimized when individual threads finish executing at the same time. Described below, a proof of asymmetric power throttling to optimize system performance is shown, and empirical data is given supporting potential speedups for 2 and 3 threaded programs.

In one embodiment, APT module 130 may be implemented in a user-level runtime environment. In another embodiment, APT module 130 may be implemented in an operating system. In yet another embodiment, asymmetric power throttling module 130 may be implemented in hardware of multiprocessor system 100

Embodiments of multiprocessor 120 include two or more processing units. A processing unit includes a unit, either physically or logically, for executing instructions. Multiprocessor 120 includes four processing units, shown as cores 101-104. The power setting on each core 101-104 may be individually controllable. While embodiments herein are described using multiprocessors having cores, it will be understood that embodiments of a multiprocessor may use other types of processing units.

Processor 120 may include power control logic 110 coupled to each core 101-104 by control lines 105-108, respectively. Control lines 105-108 may be used to individually control the power consumption of each core 101-104. In other embodiments, control lines 105-108 may be used to turn a core on or off, or perform other power control functions of cores 101-104.

In the embodiment of FIG. 1, APT module 130 is coupled to power control logic 110 to provide throttling directions to power control logic 110. Power control logic 110 implements these throttling commands on cores 101-104. In an alternative embodiment, APT module 130 may throttle cores 101-104 individually without use of power control logic 110.

In one embodiment, multiprocessor 120 includes a chip multiprocessor (CMP). In one embodiment, cores 101-104 are formed on a single die. In another embodiment, APT module 130 is formed on the same single die as cores 101-104. In this particular embodiment, APT module 130 may be implemented as a state machine.

In another embodiment, multiprocessor 120 may include a symmetric multithreading processor (SMP). In an SMP system, two or more processing units share a main memory.

In yet another embodiment, multiprocessor 120 may be implemented using simultaneous multithreading (SMT). In SMT, a single physical processor is made to appear as multiple logical processing units, such as cores, to operating systems and user programs. For simultaneous multithreading (SMT), multiple software threads can be active and execute simultaneously on a single processor without switching. That is, each logical processing unit maintains a complete set of the architecture state, but many other resources of the physical processor, such as caches, execution units, branch predictors, control logic and buses are shared. For SMT, the instructions from multiple software threads thus execute concurrently on each logical processing unit.

In an embodiment of the invention using SMT, one power setting is used with each core even though a core may be executing two or more threads. Each thread may be timed individually. Threads may be moved between cores to perform load balancing among the cores.

Asymmetric power throttling module 130 may use one or more thread timers. Thread timers are used to determine the execution time of threads executing on cores 101-104. In one embodiment, such timers may be implemented as part of a software scheduler (described below). In alternative embodiments, thread timers may be implemented in hardware as part of multiprocessor system 100.

As stated earlier, the power settings of cores 101-104 may be individually controlled to optimize performance of multiprocessor 120. This ability is described herein as "asymmetric power throttling." Asymmetric power throttling involves throttling processing units to different power degrees with the goal of equalizing the end time of each of the concurrently executing threads in the system. This algorithm can be applied to both Open System Environments (OSE) and Tightly Coupled Environment (TCE) programming models, and in any MP form, including SMT, SMP and CMP. While embodiments of an asymmetric power throttling algorithm are described herein for a dynamic asymmetric power throttling MP, embodiments herein may be applied to a static asymmetric MP. A static asymmetric MP includes multiple cores having different power consumption attributes by design, or statically, and therefore different performance ability.

Embodiments of asymmetric power throttling to correct load imbalance by equalizing execution time for a multi-threaded application may result in significant performance improvements for multi-threaded applications. Load imbalance describes a situation where parallel executing threads have varied execution times; load balancing equalizes the execution times of these threads. In an application with load imbalance, the optimal performance for a multi-threaded application may be achieved when independent threads that are concurrently executing finish at the same time. If there is load imbalance, then there is potential for performance improvements.

Embodiments herein provide a robust optimization algorithm in a runtime environment that can take advantage of monitored dynamic behavior of thread execution time via online or offline analysis of execution to drive judicious thread power throttling algorithms to improve overall performance within a fixed power budget without requiring access to program code. Below, asymmetric power throttling is described, and then embodiments of a power throttling mechanism that monitors thread execution time in order to improve performance is described.

Asymmetric Power Throttling

Embodiments herein utilize a key observation in the activity of a multiprocessor system. In a system where there exists the same number of ready threads as number of processing units, and where there is a fixed power budget, for optimal performance, all threads should finish at the same time. Optimal performance results in minimizing the total execution time of threads of a program that are executing in parallel.

Because the Energy exerted Per Instruction (EPI) goes up as power consumption goes up, as little power as possible is used in a processing unit executing a thread assuming that it is not delaying overall execution time. EPI describes the amount of energy expended to process each instruction.

Embodiments herein operate within a fixed power budget for the multiprocessor. A fixed power budget may be expressed as: $P=(EPI) \times (IPS)$ where P is the fixed power budget, EPI is the average energy per retired instruction, and IPS (instruction per second) is the aggregate number of instructions retired per second across all cores. In one embodiment, power budgets and power settings are managed in terms of Watts (W).

Therefore, assuming a fixed power budget and the ability to throttle the power allocation to the threads asymmetrically (i.e., with different power levels), then the threads with the least amount of instructions to execute should be executed with very little power and the threads with the most number of instructions should be executed with the most power. With this algorithm, the overall time to execute all of the threads will be at a minimum. Asymmetric power throttling is described herein as the power provided to a thread, however, it will be understood that the power is provided to a processing unit that executes the thread. In embodiments herein, one thread is executed per processing unit.

Figure 2A:
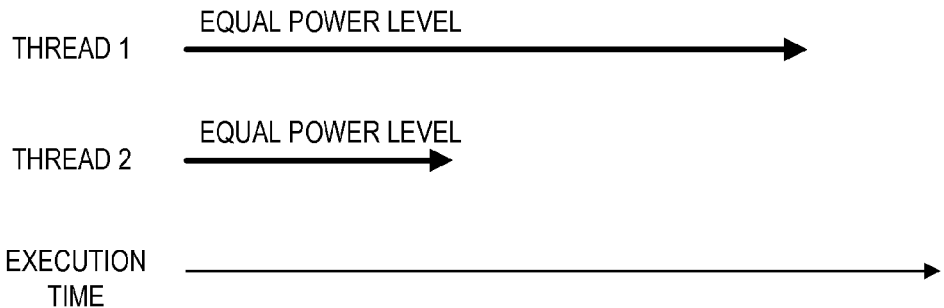
FIG. 2A is a diagram illustrating load balancing in accordance with an embodiment of the invention.
Figure 2B:
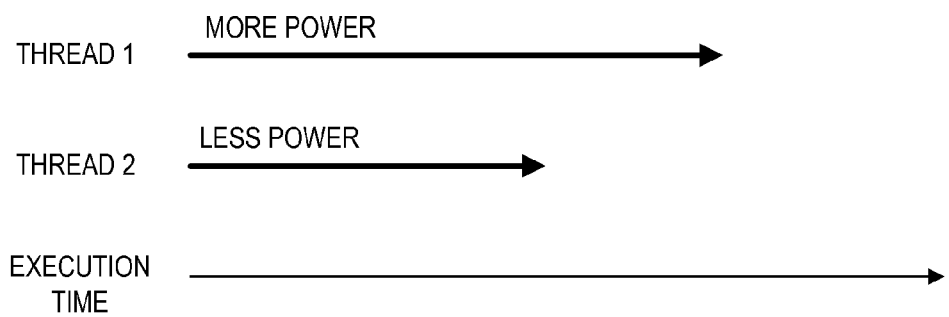
FIG. 2B is a diagram illustrating load balancing in accordance with an embodiment of the invention.
Figure 2C:
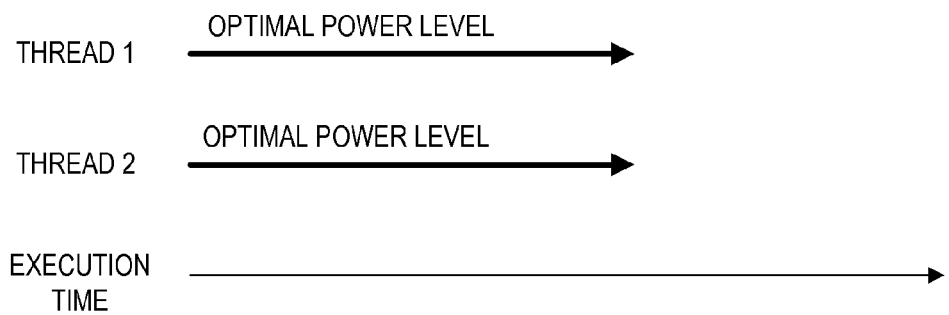
FIG. 2C is a diagram illustrating load balancing in accordance with an embodiment of the invention.

Embodiments of asymmetric power throttling are illustrated in FIGS. 2A, 2B, and 2C. FIGS. 2A-2C describe asymmetric power throttling in relation to two threads, thread 1 and thread 2. The length of the horizontal arrows for threads 1 and 2 represent the execution time of the threads. FIGS. 2A-2C also show the power level assigned to a thread in relation to the other thread. It will be noted that FIGS. 2A-2C assume a fixed total power budget to be allocated between threads 1 and 2. It will be understood that the concept of asymmetric power throttling shown in FIGS. 2A-2C may be applied to more than two threads.

In FIG. 2A, threads 1 and 2 have a different amount of instructions, but power is allocated to threads 1 and 2 equally. Hence, threads 1 and 2 complete at different times. If power is allocated equally to threads 1 and 2, then system performance is determined by the execution time of the longer thread (thread 1).

In FIG. 2B, the allocation of power is increased to thread 1 and decreased to thread 2. Hence, the execution time of thread 1 is decreased, and the execution time of thread 2 is increased. However, the total execution time is still determined by the thread 1 since thread 1 took longer to execute than thread 2.

FIG. 2C illustrates the result of optimizing power allocation to threads 1 and 2. In FIG. 2C, just enough power is allocated to threads 1 and 2 such that the execution times of both threads are substantially equivalent, resulting in minimized total execution time. The total execution time in FIG. 2C is less than the total execution times of FIGS. 2A and 2B. It will be noted that increasing/decreasing the power setting to a processing unit has a logarithmic affect on the execution time of the thread.

Load Balancing Via Asymmetric Power Throttling

Embodiments herein include a mechanism that uses asymmetric power throttling to optimize (i.e., minimize) the execution time performance of a multiprocessor system. Embodiments herein use this algorithm in a user-level runtime environment, in the operating system, or implemented fully in hardware. In short, embodiments herein use a predictive algorithm that approximates the optimal throttling solution. It relies on prior execution history to impact its future predictive throttling mechanism.

Figure 3A:
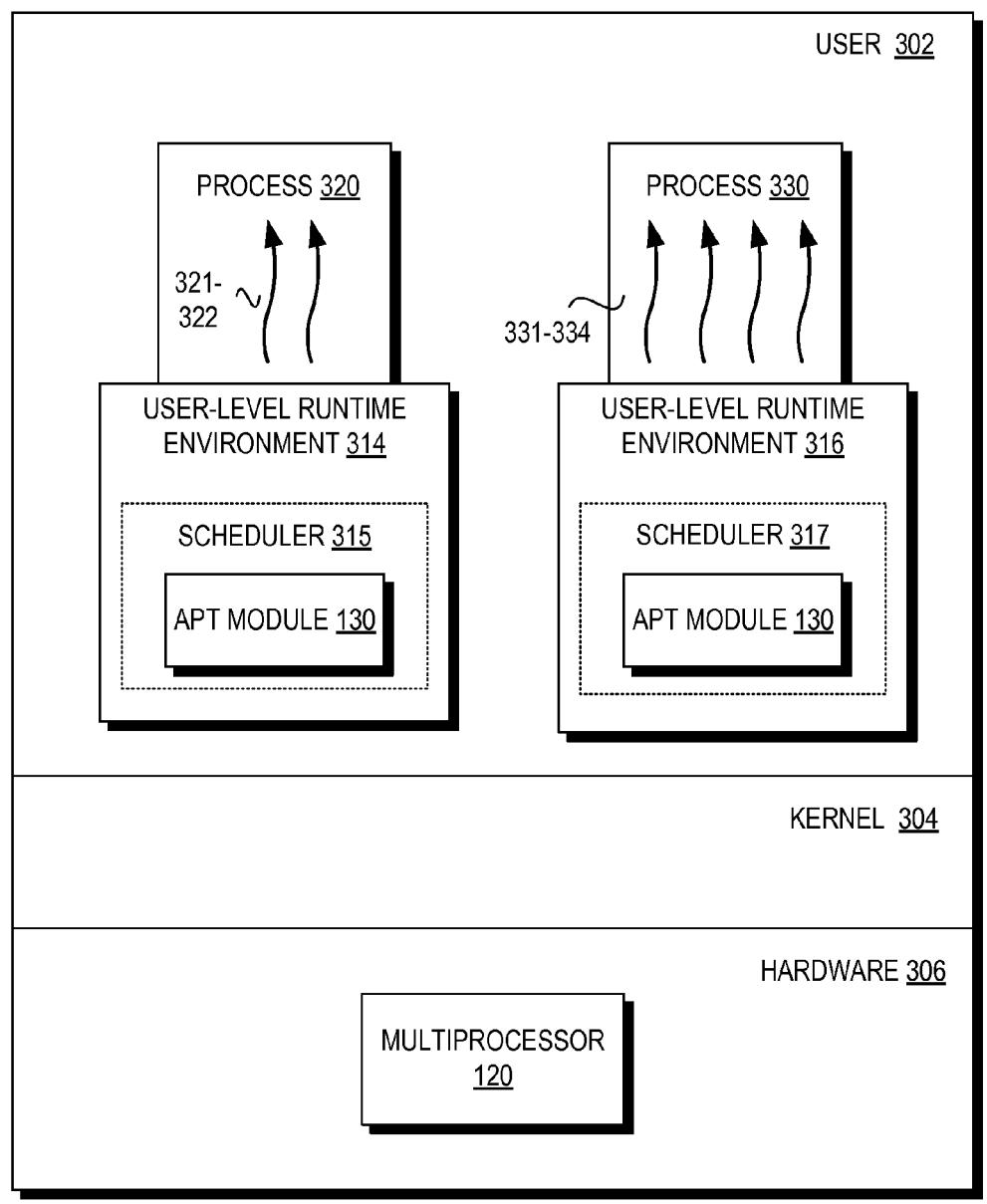
FIG. 3A is a diagram illustrating a computer system architecture in accordance with an embodiment of the invention.

Turning to FIG. 3A, a software architectural diagram of a computer system 300 in accordance with an embodiment of the invention is shown. Computer system 300 shows an implementation of the invention in a user-level runtime environment. Computer system 300 includes a user-level 302 layered on a kernel layer 304. Kernel layer 304 is layered on hardware 306.

In one embodiment, kernel layer 304 includes an operating system (OS) of computer system 300. Hardware 306 includes multiprocessor 120.

User-level 302 includes a process 320 and a process 330. In one embodiment, a process may include an executing program and the program's associated registers, variables, or the like. A program may include an application-level program, such as a word processor, a web browser, or the like.

Process 320 includes threads 321 and 322. Process 330 includes four threads 331-334. In one embodiment, a thread includes a set of instructions to be scheduled for execution on a processing unit. One or more threads are associated with a process. Multithreading allows two or more threads associated with the same process to be executed at the same time.

User-level 302 also includes a user-level runtime environment 314 to support process 320 and a user-level runtime environment 316 to support process 330. Embodiments of a user-level runtime environment include Intel® Shredlib, Microsoft® .NET Fibers, or the like.

A user-level runtime environment may include a set of procedures for handling and managing threads for the associated process. Kernel layer 304 may receive system calls from user-level runtime environments 314 and 316, but kernel layer 304 is not aware of the multithreading. In this implementation, the OS may not be aware of the threads being supported by user-level runtime environments 314 and 316.

Embodiments of asymmetric power throttling module 130 may be implemented as part of a scheduler 315 operating in user-level runtime environment 314 and a scheduler 317 operating in user-level runtime environment 316. In one embodiment, each scheduler may only asymmetrically throttle threads in its associated process. For example, scheduler 315 may asymmetrically throttle threads 321 and 322, but not threads 331-334.

In one embodiment, schedulers 315 and 317 may be implemented through a user-level runtime library for thread synchronization and user-level thread scheduling. This library may collect thread timing information during runtime, and use this information to appropriately throttle power settings to system processing units. Such a user-level library may provide a familiar programming environment for the application programmer.

Schedulers 315 and 317 may provide direction to power control module 110 as to the asymmetric power throttling of multiprocessor 120. Power control logic 110 then takes this information and sets the power to cores 101-104 as directed.

Figure 3B:
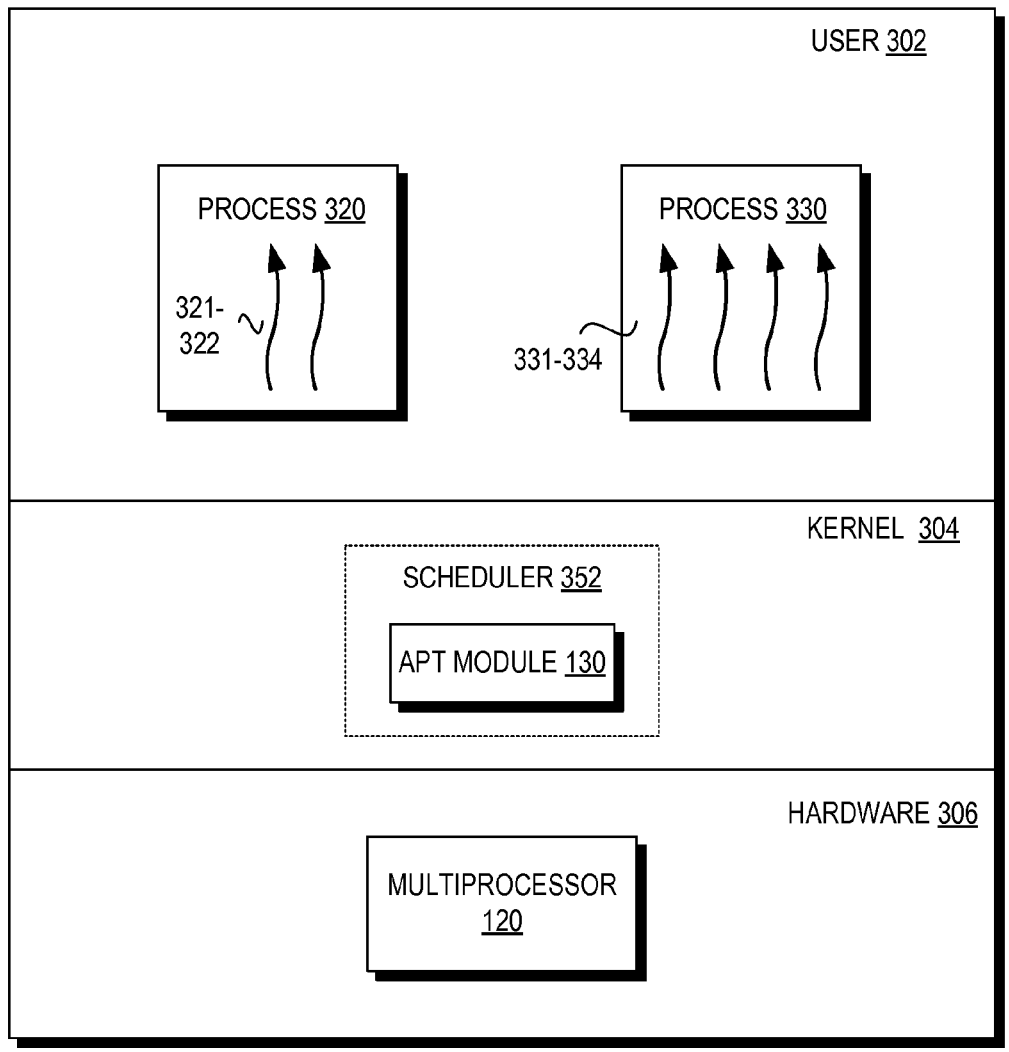
FIG. 3B is a diagram illustrating a computer system architecture in accordance with an embodiment of the invention.

Turning to FIG. 3B, a software architectural diagram of a computer system 350 in accordance with an embodiment of the invention is shown. In computer system 350, threads are managed by kernel layer 304. Asymmetric power throttling module 130 is implemented in a scheduler 352 in kernel layer 304. It is noted that computer system 350 does not include a runtime environment. Since thread management is handled at kernel layer 304, a single scheduler 352 may manage threads across the system.

In one embodiment, scheduler 352 performs asymmetric power throttling for threads associated with a single process. Embodiments herein throttle per application where an asymmetric power throttling algorithm is run for each application. For example, scheduler 352 may asymmetrically throttle threads 331-334 for a power budget, and asymmetrically throttle threads 321-322 for another power budget. In this example, the total power budget for each process may be the same or may be different.

In an alternative embodiment, asymmetric power throttling may be managed by a combination of the user level and kernel level. In yet another embodiment, asymmetric power throttling may be implemented in hardware 306. Such a hardware implementation may be on-board multiprocessor 120, or in a separate hardware device, such as part of a chipset coupled to multiprocessor 120.

Figure 4:
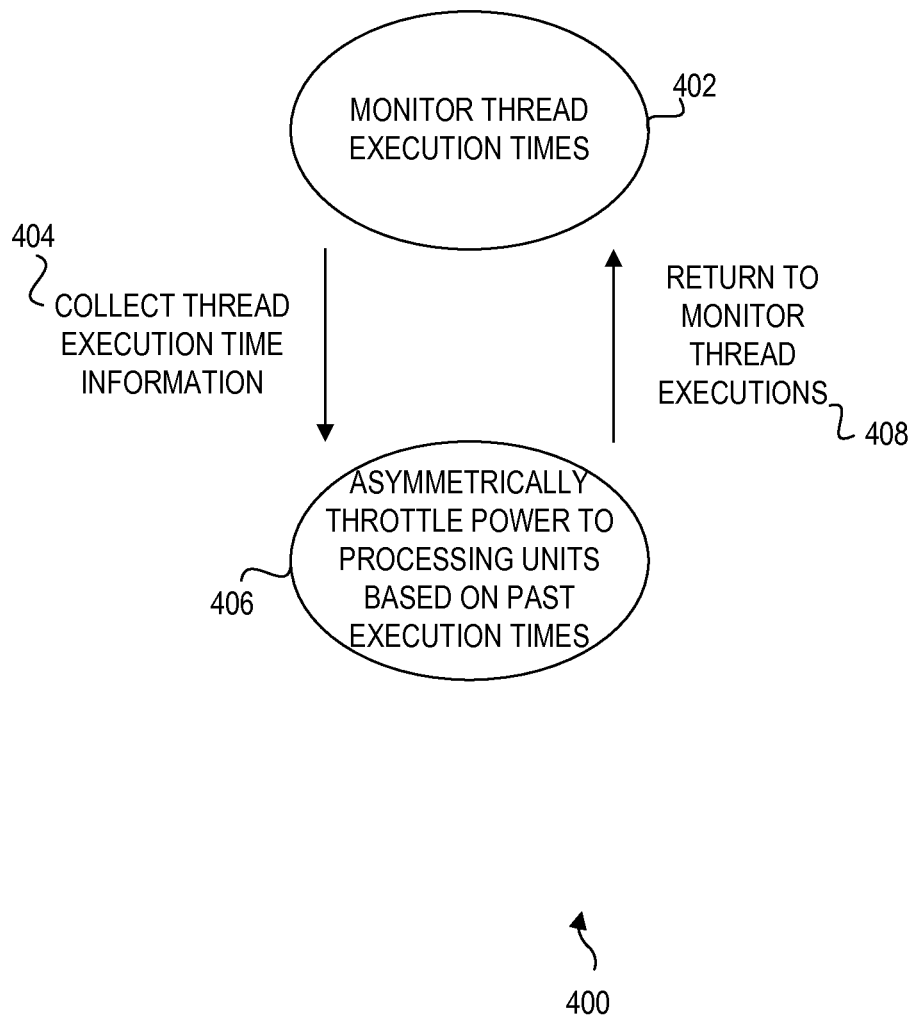
FIG. 4 is a usage model illustrating the logic and operations for load balancing via asymmetric power throttling in accordance with an embodiment of the invention.

Turning to FIG. 4, a usage model 400 of an embodiment of the invention is shown. Starting at a block 402, the execution times of threads executing in parallel are monitored. Embodiments of asymmetric power throttling may be used on threads that execute in parallel to adjust power settings so that the threads finish executing at approximately the same time.

In one embodiment, threads selected may be a subset of threads executing in parallel. For example, in FIG. 3A, if all four threads 331-334 are executed in parallel, embodiments herein may be applied to three of the four threads. Asymmetric power throttling may be used on a subset of threads if the power throttling algorithm itself is using too much power.

In one embodiment, a timer is assigned to each thread to determine the threads execution time. Such timers may be implemented as hardware of multiprocessor 120 or as part of a scheduler.

As shown at 404, thread execution time information is collected. At 406, the asymmetric power throttling logic determines power settings for future thread executions to balance future execution times. Usage model 400 then returns to 402 to monitor executions of the threads using the new power settings, as shown at 408. Thus, power is asymmetrically throttled to the processing units in future executions of the threads using execution times from past thread executions. Usage model 400 forms a feedback loop for continually balancing the power to the processing units so that the threads have similar execution times, and hence, optimizes the performance of the system.

For example, in a loop, certain threads may execute faster than other threads, a common load imbalance scenario. Embodiments herein detect which threads in the loop are the slower ones. The next time through the loop, more power is provided, in chosen increments, to the slower threads, and less power is provided to the faster threads to keep within a total power budget. This iterative process continues until load balancing of thread execution times has been reached.

In one embodiment, such a loop includes an OpenMP loop. OpenMP includes runtime library routines that support shared memory parallelism for languages, such as Fortran, C/C++, on various architectures, such as Unix® and Microsoft Windows®.

Figure 5:
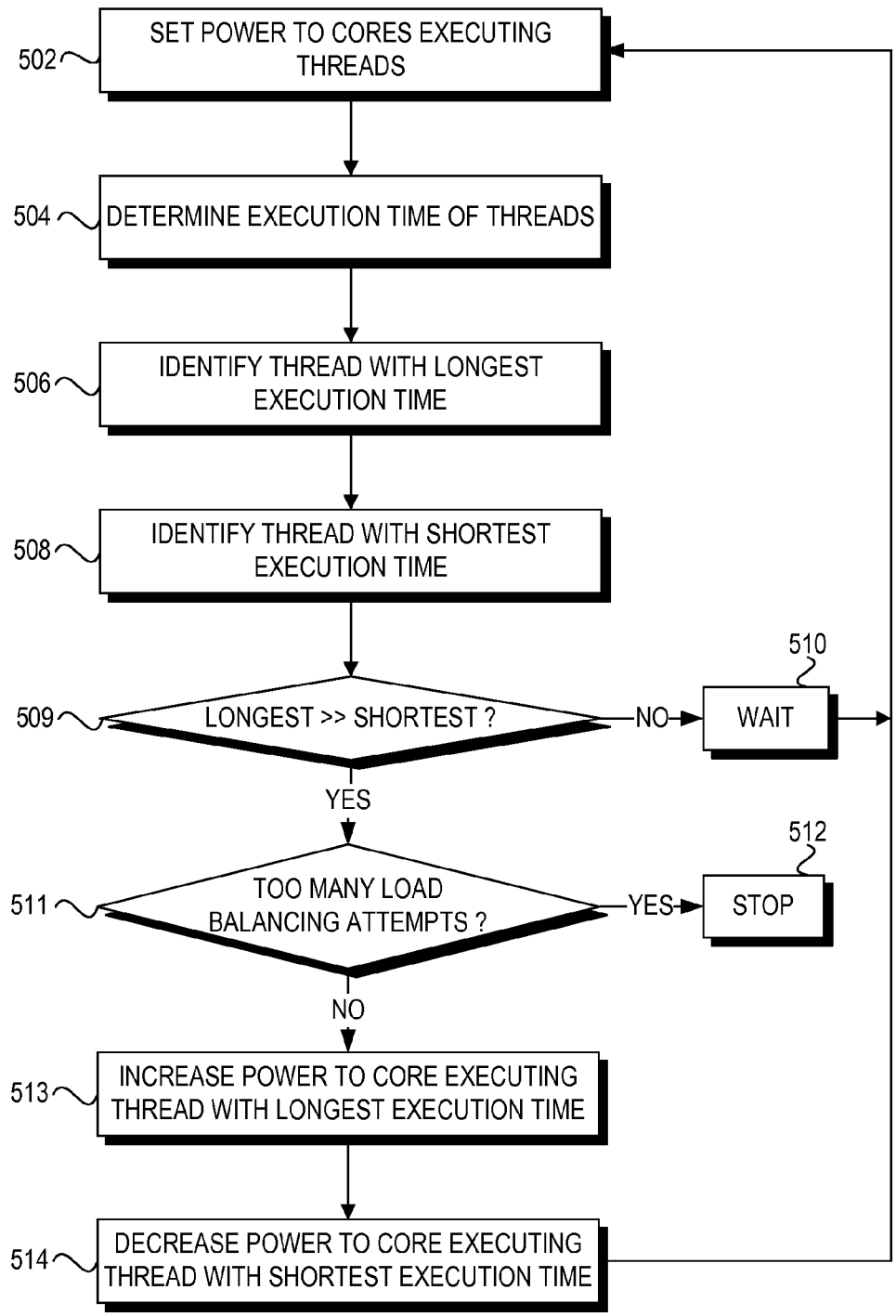
FIG. 5 is a flowchart illustrating the logic and operations for load balancing via asymmetric power throttling in accordance with an embodiment of the invention.

Turning to FIG. 5, a flowchart 500 of an embodiment of load balancing via asymmetric power throttling is shown. In one embodiment, the logic of flowchart 500 may be implemented in a scheduler. In another embodiment, the logic of flowchart 500 may be implemented in a hardware state machine.

Starting in a block 502, power is set to the cores executing the threads to be monitored. The power may be set based on the execution times monitored in previous thread executions. In another embodiment, the power settings may initially be set based on off-line analysis (discussed further below).

Proceeding to a block 504, the execution times of the threads is determined. One or more timers may be used to determine the execution times. Continuing to a block 506, the thread with the longest execution time is identified, also referred to as the "longest thread." Proceeding to a block 508, the thread with the shortest execution time is identified, also referred to as the "shortest thread."

Continuing to a decision block 509, the logic determines if the execution time of the thread with the longest execution time is substantially greater than the execution time of the thread with the shortest execution time. Embodiments herein aim to have all threads finish executing at approximately the same time. In one embodiment, substantially greater includes when the longest thread has an execution time 10% greater than the shortest thread. It will be appreciated that embodiments of the invention include other thresholds before power settings are adjusted.

If the answer to decision block 509 is no, then the logic proceeds to a block 510 for a wait period. The asymmetric power throttling algorithm waits an amount of time before executing again to reduce system overhead. Thus, the monitoring and load balancing may not necessarily be conducted on every execution of the threads of interest. For example, the monitoring and load balancing may be conducted on 20% of the thread executions.

After block 510, the logic returns back to block 502. In this instance, the threads are considered in balance, so a change is not made to the power settings of the processing units. The logic returns to block 502 to monitor another execution cycle of the threads.

If the answer to decision block 509 is yes, then the logic continues to a decision block 511. In decision block 511, the logic determines if too many load balancing attempts have been made. In one embodiment, the logic compares the number of load balancing attempts to a load balancing attempt threshold. If the threshold is exceeded, then the algorithm is not being effective and merely increasing overhead. If the answer to decision block 511 is yes, then the logic proceeds to a block 512 to stop the asymmetric power throttling algorithm. If the answer to decision block 511 is no, then the logic continues to block 513 to perform load balancing.

In block 513, the power setting to the core executing the longest thread is increased. Proceeding to a block 514, the power setting to the core executing the shortest thread is decreased. In one embodiment, the power settings are increased/decreased by a predetermined amount. For example, ⅛ of the total power budget is added to the longest thread and ⅛ of the total power budget is taken from the shortest thread. In one embodiment, the logic of blocks 513 and 514 may be referred to as "load balancing."

It will be appreciated that the power settings to the longest and shortest threads are not adjusted so as to exceed the total power budget for the multiprocessor. The power setting to the longest thread will not result in the total power budget being exceeded even if the longest thread has an execution time "substantially greater" than the shortest thread. In this instance, the power setting to the longest thread will remain as high as possible to remain within the total power budget. Similarly, the power setting to the shortest thread will not be decreased to a point that the shortest thread can no longer execute, that is, a core will not be put in a standby state or shutdown.

After block 514 the logic proceeds back to block 502 to set the power on the cores using the new power settings determined in blocks 513 and 514. Flowchart 500 continuously repeats to balance the execution times of the threads using power throttling to the cores executing the threads.

An example of flowchart 500 using three threads X, Y, and Z is as follows. In this example, threads X, Y, and Z begin executing at the same time on cores 1, 2, and 3, respectively. The execution times of the threads are monitored using a timer on each thread. Thread X finishes first. Core 1 sits idle until the remaining threads Y and Z finish. Thread Y then finishes second. Again, core 2 (as well as core 1) sits idle until thread Z finishes. Then thread Z finishes last. If the execution time of thread Z (longest thread) is substantially greater than the execution time of thread X (shortest thread), then some power is taken from core 1 and given to core 3. The power setting to core 2 is unchanged at this iteration. The execution times of the threads are monitored again and the load balancing is repeated, if necessary. It is noted that a thread finishing includes threads reaching a barrier as used in OpenMP.

In another embodiment, if new power settings are determined for load balancing, these new power settings may not necessary be applied to the processing units on the next iteration of the threads, that is, the iteration immediately following the iteration used to determine execution times. The new power settings may be applied on a future iteration of the threads to avoid slowing the executions of the threads because the system is waiting for the new power settings to be applied.

Turning to FIG. 6, an embodiment of pseudo-code for asymmetric power throttling of two threads for load balancing is shown. In one embodiment, the code of FIG. 6 may be part of a scheduler.

The pseudo-code assumes that two threads are executing in parallel, one thread per core. When thread execution begins, the appropriate power levels, denoted "Thread{X}.power", is set for the cores executing the two threads. Each thread is denoted by "X". The power settings are based on prior execution information and essentially represent a power prediction with the goal of equalizing thread execution time.

To help with a future prediction, a timer, denoted "Thread{X}.begin_timer," begins for each thread. Upon thread termination (including reaching a barrier as in OpenMP), the appropriate power throttling predictions are made for future iterations of the threads. In one embodiment, execution times are determined by use of a Time Stamp Counter (TSC). For example, if execution time for one thread is much greater than the other thread's execution time, denoted "Thread{other}.time", then power is increased by a predetermined power increment to the longer thread. At the same time, the other thread's power is reduced by the same increment. These new power levels are predictions of power levels that will be used in future executions of these threads, with the hope of equalizing execution times. Note that this can result in different power levels set to the different threads, hence asymmetric power throttling.

Embodiments of the algorithm perform effectively if load imbalance is repeatable. This may be a common case since imbalance scenarios are typically driven by data imbalance (common in OpenMP applications), and the same threads typically execute on the same data element. However, since this imbalance is data and hence run-time dependent, it is difficult to correct the imbalance apriori in software, that is, in the code of the program itself. Embodiments herein use a run-time environment that provides a dynamic tool to correct this imbalance at execution of the program.

While the pseudo-code of FIG. 6 is described for use with two threads, it may be extended to load balancing N threads. There are well known techniques to extend the code to N threads in OpenMP applications and Linear Equation Solvers. In one embodiment, load balancing may be performed on a subset of the N threads while no load balancing is performed on the remaining N threads.

Embodiments of the invention may be used in an on-line scenario, an off-line scenario, or both, to optimize system performance. On-line analysis involves asymmetric power throttling during use of a deployed program. In one embodiment, asymmetric power throttling is managed in a user-level runtime environment.

In off-line analysis, a program is profiled during development to determine which threads may be slower than others before the program is shipped to customers. Embodiments herein may be used for finding execution bottlenecks and determining power settings. This information may be stored and shipped with the program for use by a multiprocessor system.

In one embodiment, the power setting information is stored in relative form between threads since the actual platform executing the program may not be known at the software development stage. For example, off-line profiling may determine that thread 1 needs twice as much power as thread 2 to balance the execution times of threads 1 and 2. Once the program is loaded and executed on a specific platform, this power relationship, such as 2 to 1, may be converted to actual power settings, such as 3.0 watts to 1.5 watts, for the specific platform. In another embodiment, on-line asymmetric power throttling may be performed on a program that was off-line profiled to more precisely tune the load balancing for the specific platform.

A formal proof of asymmetric power throttling a two-thread program is shown below. The proof assumes the processing units may be asymmetrically power throttled as desired. The proof assumes that Thread A has X instructions, Thread B has Y instructions, and X<=Y. The proof teaches that the time to execute the program when the threads finish simultaneously (case 2) will always be less than an algorithm that utilizes a serial/parallel throttling algorithm (case 1). Specifically, the proof shows that case 1 will result in greater execution time than case 2 while Y>=X.

Serial/parallel power throttling involves powering up processing units during serial portions of code and power down processing units during parallel portions of code to improve system performance. Serial/parallel power throttling involves varying the multiprocessor's power supply voltage and clock frequency in unison according to the performance and power levels desired. To maintain a multiprocessor's total power consumption within a fixed power budget, voltage and frequency scaling may be applied dynamically as follows. In phases of low thread parallelism, a few cores may be run using high supply voltage and high clock frequency for best scalar performance. In phases of high thread parallelism, many cores may be run using low supply voltage and low clock frequency for best throughput performance. Since low power consumption for inactive cores may be desirable, leakage control techniques such as dynamic sleep transistors and body bias may be used.

Proof:

$$Power=k*(performance)\hat{\ }n$$

$$Power=k*(instructions/second)\hat{\ }n$$

$$Second\hat{\ }n=(k*(instructions)\hat{\ }n)/Power$$

$$Second=n\ sq\ root(k/power)*instructions$$

Thread A has X instructions
Thread B has Y instructions
Case 1: X<=Y with Time T1 (Serial/Parallel Throttling)
Case 2: X==Y with Time T2 (Optimal Asymmetric Throttling)

$$T1=n\ sq\ root(k/(power/2))*x+n\ sq\ root(k/power)*(y-x)$$

$$T2=n\ sq\ root(k/(power*r))*x=n\ sq\ root(k/(power*(1-r)))*y$$

$$k/(power*r)*x\hat{\ }n=k/(power*(1-r))*y\hat{\ }n$$

$$x\hat{\ }n/r=y\hat{\ }n/(1-r)$$

$$(1-r)*x\hat{\ }n=r*y\hat{\ }n$$

$$x\hat{\ }n-r*x\hat{\ }n=r*y\hat{\ }n$$

$$x\hat{\ }n=r*x\hat{\ }n=r*y\hat{\ }n$$

$$x\hat{\ }n=r(x\hat{\ }n+y\hat{\ }n)$$

$$r=x\hat{\ }n/(x\hat{\ }n+y\hat{\ }n)$$

$$T2 = n\ sq\ root(k/(power*(x^\wedge n/(x^\wedge n + y^\wedge n)))*x$$
$$= n\ sq\ root((k*x^\wedge n)/(power*(x^\wedge n/(x^\wedge n + y^\wedge n))))$$
$$= n\ sq\ root((k*(x^\wedge n + y^\wedge n)/(power))$$

Show T1>=T2 for n=2

$$n\ sq\ root(k/(power/2))*x+n\ sq\ root(k/power)*(y-x)$$
$$>=n\ sq\ root((k/power)*(x\hat{\ }n+y\hat{\ }n))$$

$$n\ sq\ root(k/power)*n\ sq\ root(2)*x+n\ sq\ root(k/power)*(y-x)>=n\ sq\ root((k/power)*(x\hat{\ }n+y\hat{\ }n))$$

$$n\ sq\ root(2)*x+(y-x)>=n\ sq\ root(x\hat{\ }n+y\hat{\ }n)$$

$$(n\ sq\ root(2)-1)*x>=n\ sq\ root(x\hat{\ }n+y\hat{\ }n)$$

$$(n\ sq\ root(2)-1)*x>=n\ sq\ root(x\hat{\ }n+y\hat{\ }n)$$

$(n \text{ sq root}(2)-1)*x+y >= x\hat{}n+y\hat{}n$

Let $n=2$ $[(\text{sq root}(2)-1)*x+y]\hat{}2 >= x\hat{}2+y\hat{}2$ $(\text{sq root}(2)-1)\hat{}2*x\hat{}2+2*(\text{sq root}(2)-1)*(x*y)+y\hat{}2 >= x\hat{}2+y\hat{}2$ $(2-2*\text{sq root}(2)+1-1)*x\hat{}2+2*(\text{sq root}(2)-1)*(x*y) >= 0$ $(2-2*\text{sq root}(2))*x+2*(\text{sq root}(2)-1)*y >= 0$ $2*(1-\text{sq root}(2))*x+2*(\text{sq root}(2)-1)*y >= 0$ $(\text{sq root}(2)-1)*y-(\text{sq root}(2)-1)*x >= 0$ $y-x >= 0$ $y >= x$ Therefore, T1 is only greater than T2 if two threads have different number of instructions, assuming equal power distribution.

Table 1 below shows the results of empirically testing the proof. Table 1 shows results assuming two and three threads of execution of varying lengths. For the two thread case, a configuration is modeled that includes one thread which is twice the length of the second thread. Within this configuration, if power is distributed evenly (as shown in the "Equal Power" column of Table 1), then performance is not optimal. Performances of the two and three thread cases for equal power is shown having a baseline of 1.

If serial/parallel throttling is applied, then performance is enhanced. Performance is increased to 1.10 and 1.15 for the two and three thread cases, respectively. However, with embodiments of asymmetric power throttling as described herein, performance is increased an additional 10% over the serial/parallel algorithm. Furthermore, as the number of processing units and threads is increased, the performance benefit over the serial/parallel throttling algorithm is greater. This scaling is important, since future multiprocessors may include numerous processing units.

TABLE 1

Performance Modeling Comparison

|  | Equal Power | Serial/Parallel Throttling | Asymmetric Power Throttling |
|---|---|---|---|
| 2 Threads | 1 | 1.10 | 1.20 |
| 3 Threads | 1 | 1.15 | 1.30 |

Embodiments of a Computer System

Figure 7:
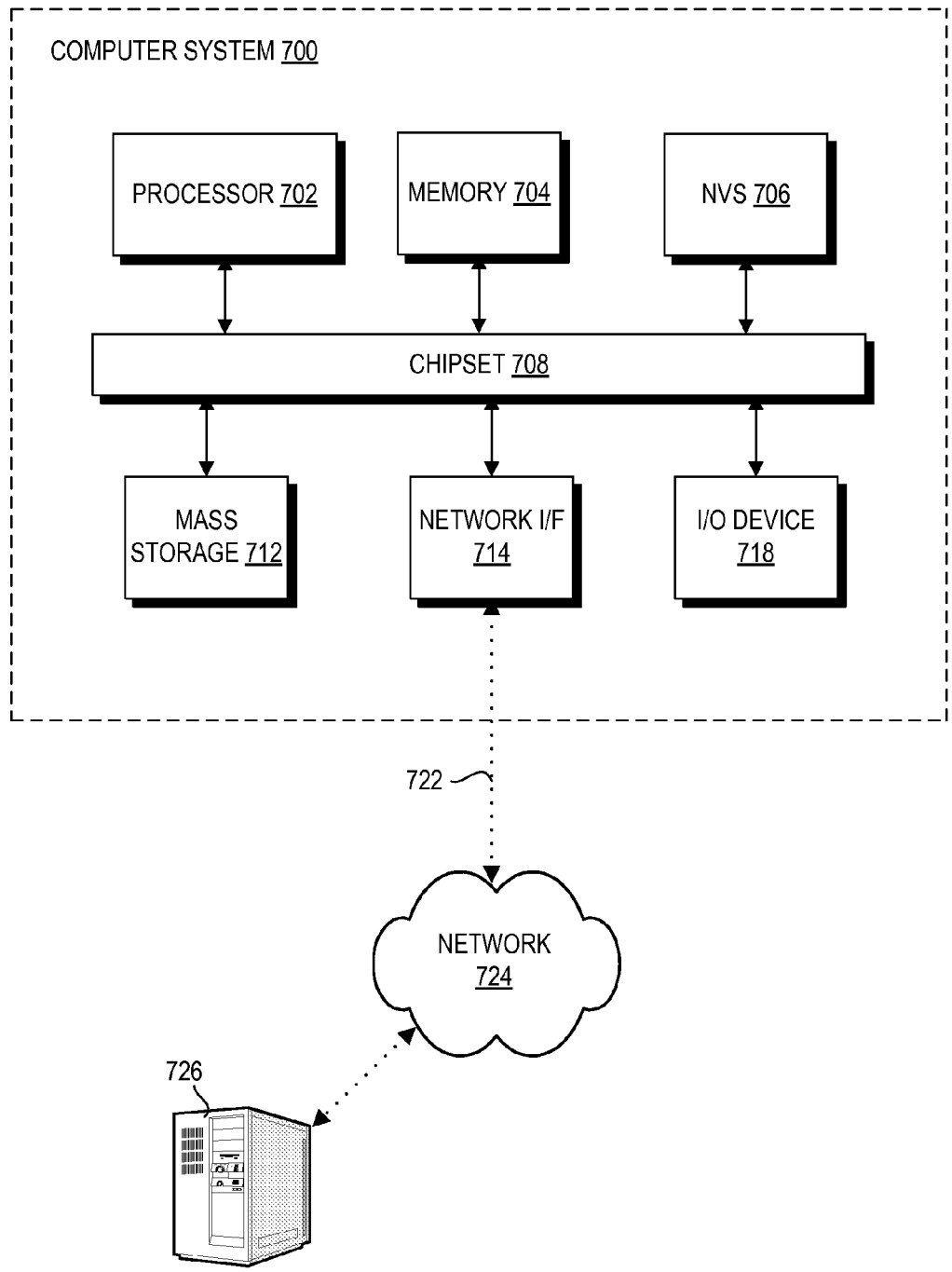
FIG. 7 is a diagram illustrating embodiments of a computer system for implementing embodiments of the invention.

FIG. 7 illustrates embodiments of a computer system 700 on which embodiments of the present invention may be implemented. Computer system 700 includes a processor 702 and a memory 704 coupled to a chipset 708. Mass storage 712, Non-Volatile Storage (NVS) 706, network interface (UF) 714, and Input/Output (I/O) device 718 may also be coupled to chipset 708. Embodiments of computer system 700 include, but are not limited to, a desktop computer, a notebook computer, a server, a personal digital assistant, a network workstation, or the like. In one embodiment, computer system 700 includes processor 702 coupled to memory 704, processor 702 to execute instructions stored in memory 704.

Processor 702 may include a multiprocessor. In one embodiment, processor 702 may include, but is not limited to, an Intel® Corporation multiprocessor, such as a Xeon® family processor, or the like. In one embodiment, computer system 700 may include multiple processors.

Memory 704 may include, but is not limited to, Dynamic Random Access Memory (DRAM), Static Random Access Memory (SRAM), Synchronized Dynamic Random Access Memory (SDRAM), or the like. In one embodiment, memory 704 may include one or more memory units that do not have to be refreshed.

Chipset 708 may include a memory controller, such as a Memory Controller Hub (MCH), an input/output controller, such as an Input/Output Controller Hub (ICH), or the like. In an alternative embodiment, a memory controller for memory 704 may reside in the same chip as processor 702. Chipset 708 may also include system clock support, power management support, audio support, graphics support, or the like. In one embodiment, chipset 708 is coupled to a board that includes sockets for processor 702 and memory 704.

Components of computer system 700 may be connected by various interconnects, such as a bus. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 718 may include a keyboard, a mouse, a display, a printer, a scanner, or the like.

Computer system 700 may interface to external systems through network interface 714 using a wired connection, a wireless connection, or any combination thereof. Network interface 714 may include, but is not limited to, a modem, a Network Interface Card (NIC), or the like. A carrier wave signal 722 may be received/transmitted by network interface 714. In the embodiment illustrated in FIG. 7, carrier wave signal 722 is used to interface computer system 700 with a network 724, such as a Local Area Network (LAN), a Wide Area Network (WAN), the Internet, or any combination thereof. In one embodiment, network 724 is further coupled to a computer system 726 such that computer system 700 and computer system 726 may communicate over network 724.

Computer system 700 also includes non-volatile storage 706 on which firmware may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

Mass storage 712 includes, but is not limited to, a magnetic disk drive, such as a hard disk drive, a magnetic tape drive, an optical disk drive, or the like. It is appreciated that instructions executable by processor 702 may reside in mass storage 712, memory 704, non-volatile storage 706, or may be transmitted or received via network interface 714.

In one embodiment, computer system 700 may execute an Operating System (OS). Embodiments of an OS include Microsoft Windows®, the Apple Macintosh® operating system, the Linux® operating system, the Unix® operating system, or the like. In one embodiment, instructions for a scheduler running in a user-level runtime environment as described herein may be stored on mass storage 712.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.). In addition, a machine-accessible medium may include propagated signals such as electrical, optical, acoustical or other forms of propagated signals (e.g., carrier waves, infrared signals, digital signals, etc.).

Various operations of embodiments of the present invention are described herein. These operations may be implemented using hardware, software, or any combination thereof. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that if executed by a machine, will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

We claim:

1. A non-transitory machine-accessible storage medium including instructions that, when executed by a machine, cause the machine to perform a method comprising:
    determining a first execution time of a first thread of a process previously executed on a first processing unit of a multiprocessor;
    determining a second execution time of a second thread of the process previously executed on a second processing unit of the multiprocessor;
    adjusting a first power to the first processing unit and a second power to the second processing unit according to the first and second execution times of the first and second threads, wherein adjusting the first and second powers is for future execution of the same first and second threads of the process; and
    wherein the adjusted first and second powers have a total power value below or equal to a total power budget for the multiprocessor.

2. The non-transitory machine-accessible storage medium of claim 1, wherein adjusting the first and second powers to the first and second processing units respectively includes:
    increasing the first power provided to the first processing unit at a future execution of the first thread in response to the first execution time being greater than the second execution time.

3. The non-transitory machine-accessible storage medium of claim 1, wherein adjusting the first and second powers to the first and second processing units respectively includes:
    decreasing the second power provided to the second processing unit at a future execution of the second thread in response to the first execution time being greater than the second execution time.

4. The non-transitory machine-accessible storage medium of claim 1 having further instructions to perform a further method comprising:
    maintaining same power to the first and second processing units at future executions of the first and second threads in response to the first and second execution times being the same.

5. The non-transitory machine-accessible storage medium of claim 1 having further instructions to perform a further method comprising:
    independently adjusting the first and second powers for each of the first and second processing units.

6. The non-transitory machine-accessible storage medium of claim 1 having further instructions to perform a further method comprising:
    waiting for a period of time before adjusting the first and second powers.

7. The non-transitory machine-accessible storage medium of claim 1 having further instructions to perform a further method comprising:
    halting load balancing when a number of attempts for load balancing exceed a threshold.

8. The non-transitory machine-accessible storage medium of claim 1, wherein adjusting the first power to the first processing unit and the second power to the second processing unit is to effectuate the first and second threads of the process to finish executing at approximately the same time in future executions of the first and second threads of the process.

9. The non-transitory machine-accessible storage medium of claim 8, wherein the future executions of the first and second threads being on the first and second processors of the multiprocessor respectively.

10. The non-transitory machine-accessible storage medium of claim 1 having further instructions to perform a further method comprising:
    determining N execution times of N threads executing on N processing units of the multiprocessor, wherein the N threads are in addition to the first and second threads; and
    maintaining same power to the N processing units in response to the N execution times being between the first and second execution times.

11. The non-transitory machine-accessible storage medium of claim 10, wherein the method is performed on a subset of the N threads.

12. The non-transitory machine-accessible storage medium of claim 1, wherein adjusting the first and second powers comprises adjusting the first and second powers by a predetermined amount.

13. A method comprising:
    determining a first execution time of a first thread of a process previously executed on a first processing unit of a multiprocessor;
    determining a second execution time of a second thread of the process previously executed on a second processing unit of the multiprocessor;
    adjusting a first power to the first processing unit and a second power to the second processing unit according to the first and second execution times of the first and second threads, wherein adjusting the first and second powers is for future execution of the same first and second threads of the process; and wherein the adjusted first and second powers have a total power value below or equal to a total power budget for the multiprocessor.

14. The non-transitory machine-accessible storage medium of claim 1, wherein the instructions are to be executed in at least one of: a user-level runtime environment or kernel layer.

15. A multiprocessor comprising:
a first processing unit to operate at a first power; and
a second processing unit to operate at a second power;
wherein an asymmetric power throttling module to cause adjustment of the first power to the first processing unit and the second power to the second processing unit according to first and second execution times of previously executed first and second threads of a process, wherein the first and second threads are previously executed on the first and second processing units respectively,
wherein the adjustment of the first and second powers is for future execution of the same first and second threads of the process; and
wherein the adjusted first and second powers have a total power value below or equal to a total power budget for the multiprocessor.

16. The multiprocessor of claim 15 further comprises a power control unit which is operable to adjust the first and second powers to the corresponding first and second processing units.

17. The multiprocessor of claim 15 further comprises one or more logic units to determine the first and second execution times of the first and second threads of the process.

18. The multiprocessor of claim 15, wherein the asymmetric power throttling module to increase power provided to the first processing unit and to decrease power provided to the second processing unit in response to the first execution time of the first thread being substantially greater than the second execution time of a second thread.

19. The multiprocessor of claim 15, wherein the asymmetric power throttling module to cause the first and second processing units to maintain same power to the first and second processing units at future executions of the first and second threads in response to the first and second execution times being the same.

20. The multiprocessor of claim 15, wherein the asymmetric power throttling module is implemented at least in one of: a hardware logic or in an operating system.

21. The multiprocessor of claim 15, wherein the first and second processing units are positioned in a single die.

22. The multiprocessor of claim 15 further comprises logic to delay adjusting of the first and second powers.

23. The multiprocessor of claim 15, wherein the first and second processing units implement at least one or more of: simultaneous multi-threading or symmetric processing.

24. A computer system comprising:
a network communication interface; and
a multiprocessor coupled to the network communication interface, the multiprocessor including:
a first processing unit to operate at a first power;
a second processing unit to operate at a second power;
wherein an asymmetric power throttling module to cause adjustment of the first power to the first processing unit and the second power to the second processing unit according to first and second execution times of previously executed first and second threads of a process, wherein the first and second threads previously executed on the first and second processing units respectively, and wherein the adjustment of the first and second powers is for future execution of the same first and second threads of the process; and
wherein the adjusted first and second powers have a total power value below or equal to a total power budget for the multiprocessor.

25. The computer system of claim 24, wherein the multiprocessor further comprises a power control unit operable to adjust the first and second powers to the corresponding first and second processing units.

26. The computer system of claim 24, wherein the asymmetric power throttling module to increase power provided to the first processing unit and to decrease power provided to the second processing unit in response to the first execution time of the first thread being substantially greater than the second execution time of a second thread.

27. The computer system of claim 24, wherein the asymmetric power throttling module to cause the first and second processing units to maintain same power to the first and second processing units at future executions of the first and second threads in response to the first and second execution times being the same.

28. The computer system of claim 24, wherein the asymmetric power throttling module is implemented at least in one of: a hardware logic or in an operating system.

29. The computer system of claim 24, wherein the first and second processing units are positioned in a single die.

* * * * *